C. S. WILLIAMSON.
HOISTING AND CONVEYING APPARATUS.
APPLICATION FILED FEB. 2, 1914.
1,161,274.
Patented Nov. 23, 1915.
2 SHEETS—SHEET 1.
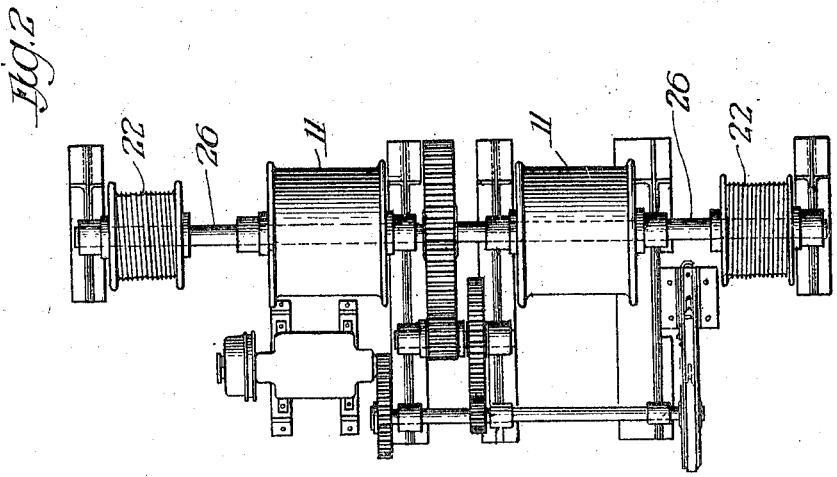
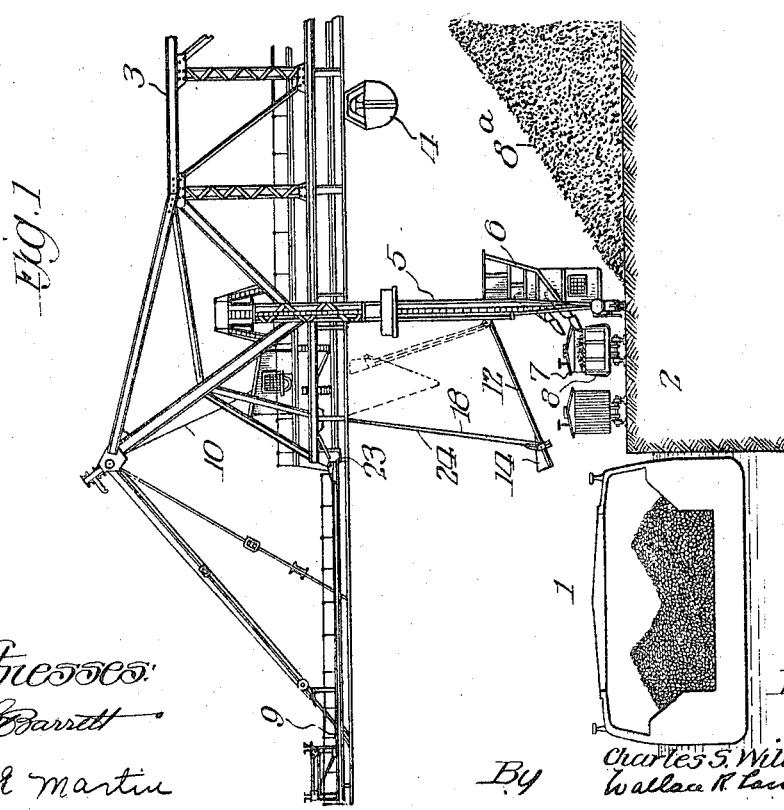

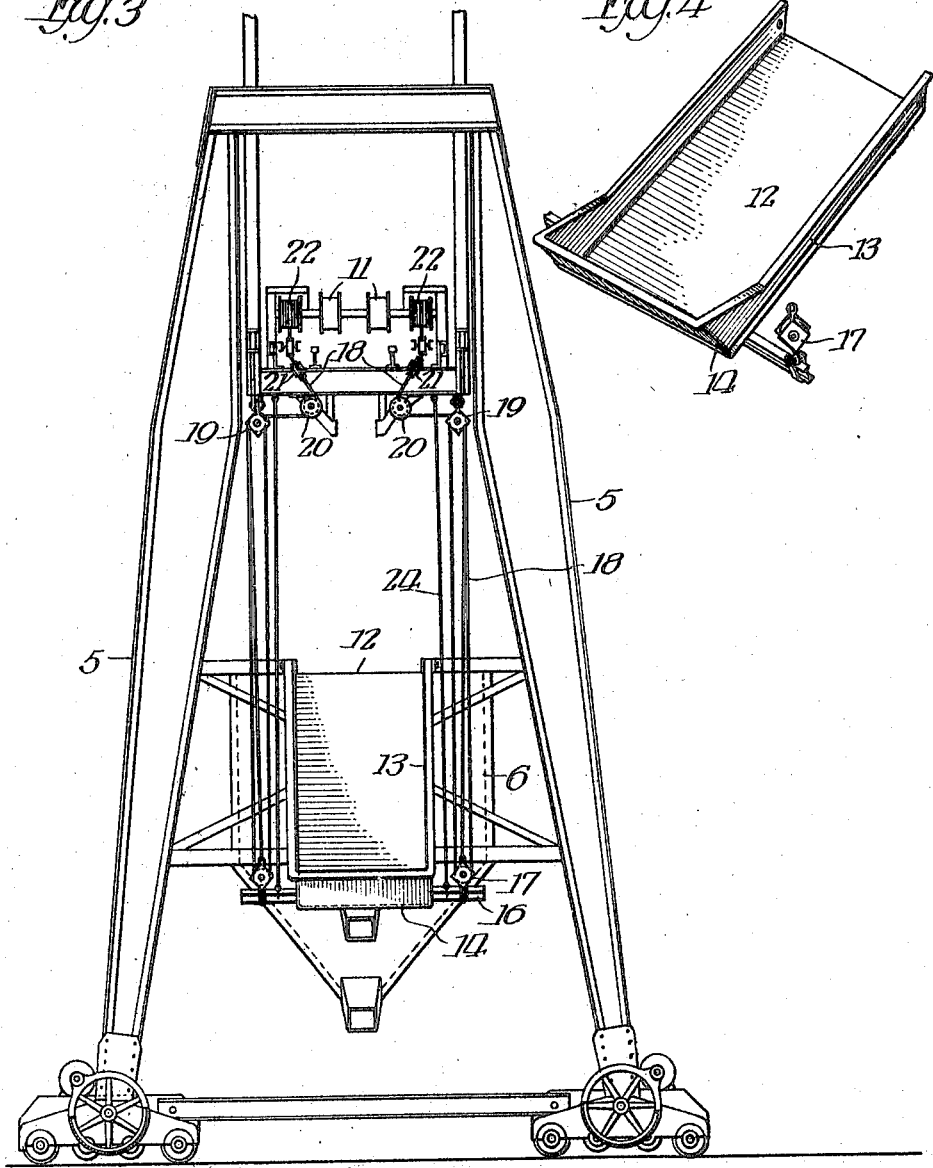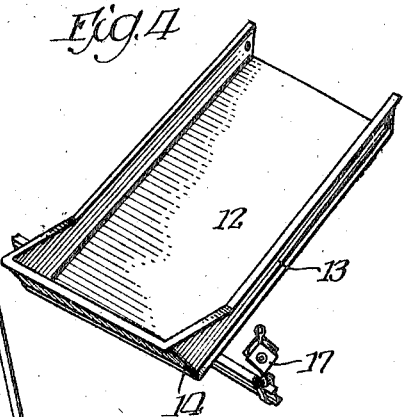

UNITED STATES PATENT OFFICE.

CHARLES S. WILLIAMSON, OF CHICAGO, ILLINOIS.

HOISTING AND CONVEYING APPARATUS.

1,161,274.  Specification of Letters Patent.  Patented Nov. 23, 1915.

Application filed February 2, 1914. Serial No. 815,933.

*To all whom it may concern:*

Be it known that I, CHARLES S. WILLIAMSON, a citizen of the United States, residing at Chicago, in the county of Cook and State of Illinois, have invented new and useful Improvements in Hoisting and Conveying Apparatus, of which the following is a specification of one embodiment thereof.

This machine relates to machinery for conveying bulk material, such as coal or ore, or the like, from place to place, for instance from a vessel to a car, or vice versa.

More specifically the invention relates to a shield or protector, for use in connection with an apparatus for conveying bulk material, designed to prevent injury to workmen or obstruction of the traffic by the spill of the material being conveyed, during its travel to its point of deposit and the saving of the material so dropped.

One of the general types of hoisting and conveying apparatus with which my invention may be used, comprises, generally stated, a long bridge or support mounted on standards or legs at a considerable distance above the ground in which bridge or support runs a trolley from which in turn is suspended a grab bucket of a well-known form. This bucket drops into the bulk material to be conveyed and picks up a load therefrom, runs back upon the bridge and drops its load, either upon a pile or onto an apparatus for feeding the material into a box, car or the like. During the course of the travel of each bucket of material, there is inevitably a certain amount of leakage or spill from the grab bucket as it is being rapidly pulled through the air. Inasmuch as the travel of the grab bucket is usually over a space where workmen are engaged below, such as a boat or across railroad tracks, before it reaches the proper discharge point, the dropping or spill from the grab bucket of large lumps of coal or heavy lumps of iron, ore, or other material is extremely dangerous, not only because the coal or other material may fall upon some workman below, but also because it obstructs traffic. This waste of the material dropping or spilling from the grab bucket is of course further objectionable in that it necessitates at intervals, a supplementary cleaning up process.

The object of my invention is to provide a simple and economical shield so constructed and arranged that it prevents the dropping below of material from the grab bucket in any place except an intended place of deposit thereof.

Another object of my invention is to provide a shield having thereon a compartment or pocket in which all coal or ore or material dropping or spilling from the grab bucket will be collected and from which it may be readily removed.

Another object of my invention is to construct and arrange the shield and its supporting devices in such a fashion that by a very simple operation, all the material which has been dropped upon the shield since the last time it was emptied can readily be emptied off into a hopper or upon a pile, as the case may be.

Another object of my invention is to provide an automatic connection between the shield tilting devices and the apron lifting device whereby the shield is automatically cleaned of its droppings each time the apron is raised during the operation of the unloading machinery.

In the drawings, which show a device embodying one form of my invention, Figure 1 represents a partial view of unloading machinery at work, showing my invention as applied thereupon. Fig. 2 is a specific modification of certain hoisting machinery which may be used in connection with my invention. Fig. 3 is an end elevation of the bridge and unloading machinery showing my invention in further detail. Fig. 4 is a perspective view of the shield or protector.

In the drawings 1 designates a boat, 2 a wharf, 3 represents in general the bridge of the unloading apparatus upon which travels the grab bucket 4 operating in a well-known fashion and controlled by well-known machinery.

The bridge 3 is supported on legs 5 at a considerable height from the ground, so as to permit of the passage of box-cars etc. thereunder. These legs 5 are provided at their lower ends with suitable rollers or wheels designed to travel on a suitable track so that the bridge may be moved as a whole. Mounted at the lower end of each leg is a suitable motor, (as best shown in Fig. 3) by means of which the bridge is moved along the track.

In the forward legs 5 of the bridge 3 is, in this instance, provided a hopper 6 into which coal or ore, or other material may be discharged from the grab bucket 4 for subsequent deposit into box cars 7 or gondola cars 8, as the case may be. At the forward end of the bridge 3 is an apron 9 which may be raised at will by the operator of the unloading machinery to allow the masts or other high parts of the vessel being unloaded to pass under. This apron is operated by cables 10 upon drums 11, Fig. 2.

So far, what has been described is old and well-known in the art. I will now describe the application of the shield or protector forming the subject-matter of my invention. Pivotally mounted in the legs 5 immediately above the hopper 6, I provide a long shield 12 having sides 13, which sides increase in height at one end to form the large pocket 14, whose bottom is simply a continuation of the shield 12 and which has the capacity of one or more full grab bucket loads of material. The shield 12 is open at its forward end and is attached in the specific modification herein disclosed, to an angle iron 16 carrying sheaves 17 through which are threaded the cables 18, these cables passing over sheaves 19, 20 and 21, supported in the bridge structure and leading to drums 22 which will be hereinafter described.

To limit the downward movement of the free end of the shield 12, I provide a pair of cables 24, which cables are attached at one end by any suitable means to the support or bridge and at their opposite end to the bar 15 near the free end of said shield. The cables are of sufficient length to allow the said shields to normally hang on an incline with the end provided with the pocket lowermost so as to prevent the material from rolling out the opposite end which is open, until the lowermost end of said shield has been raised by the hoisting mechanism.

In Fig. 2 I have illustrated one form of hoisting machinery for manipulating the apron and raising the shield. The driving device, motor, etc. used in revolving the drums shown in the figure are immaterial to the invention and will not be specifically described. Suffice it to say that I provide the usual shaft 26 upon which are the drums 11 hereinbefore referred to, for raising the apron, with other drums 22 preferably one at either end for raising the shield 12. These drums carry the cables 18 hereinabove alluded to by which the shield may be raised. Thus whenever the apron is raised in the operation of the unloading machinery, one end of the shield 12 is automatically raised and the shield cleaned of the droppings or spillage from the grab bucket, without any attention whatever on the part of the operator.

It is of course obviously possible and within the scope of my invention to provide separate driving connections for the drums 22 whereby the matter of raising the shield is made independent of the raising of the apron. Inasmuch, however, in the normal operation of an apparatus of this character the apron is frequently raised, I believe that to connect the shield and apron in the manner described, for operation, together, is preferable because it relieves the operator from the necessity of paying any attention at all to the shield.

It will of course be understood that the shield 12 and its hoisting mechanism may be used in connection with a bridge or support, either with or without an apron, and in practice will be so used to a certain extent.

The operation is as follows: The grab bucket 4 dips into the vessel 1 and travels up over the tracks upon which are the cars 7 to deposit its load either in the hopper 6 or upon the pile 8ᵃ. During this travel of the grab bucket there are occasional droppings or spillage of the material handled. However, no such droppings or spillage can according to my invention occur, except: upon the shield, in the hopper, or upon the pile, thus workmen below are protected from being struck by falling coal, etc. and the tracks are not obstructed by such material. As soon as sufficient material has accumulated in the bucket 14, the operator merely causes the drums 22 to be rotated, whereupon the shield is tilted from its position as shown in full lines in Fig. 1 to its position shown in dotted lines and all the coal or other material upon the shield slides upon this instance directly down into the hopper 6 whereupon the shield is lowered and the operation of the clam continues as before. I consider this automatic discharge of material accumulated upon the shield an important feature of my invention and broadly new.

I claim:—

1. In an apparatus of the class described, a frame having a support at one end thereof and an apron mounted thereon, a shield pivotally mounted in said support, mechanism for automatically raising said shield with said apron.

2. In an apparatus of the class described, a bridge, a grab bucket suspended therefrom and adapted to travel there along, a shield located between the loading and delivery points of said bucket underlying a portion of the travel of the bucket and adapted to collect and retain spillage therefrom and means for indirectly dumping the accumulated spillage below said shield.

3. In an apparatus of the class described, a bridge, a grab bucket suspended therefrom and adapted to travel there along, an inclined shield underlying a portion of the travel of the bucket adapted to collect and retain at its lower end spillage therefrom and means for dumping the accumulated spillage from the normally higher end of said shield, to a point at one side of said shield, whereby the spillage is both collected and transferred without danger of dropping upon railroad tracks or workmen.

4. In an apparatus of the class described, a bridge, a grab bucket suspended therefrom and adapted to travel there along, an inclined shield underlying a portion of the travel of the bucket adapted to collect and retain spillage therefrom and means for dumping the accumulated spillage from the normally higher end of said shield into a hopper, from where it may be discharged into a transporting receptacle below said shield.

5. In an apparatus of the class described, a bridge, a conveyer adapted to travel there along, a support for one end of the bridge, a shield pivoted at one end in the support and underlying a portion of the travel of said bucket and adapted to collect and retain the spillage therefrom, a hopper near the pivotal point of said shield, a pocket near the opposite end of said shield and means to tilt the shield for dumping the accumulated spillage into the hopper.

In witness whereof, I hereunto subscribe my name to this specification in the presence of two witnesses.

CHARLES S. WILLIAMSON.

Witnesses:
C. C. BROOKS,
CHAS. A. OSBORN.